(12) United States Patent
Loui et al.

(10) Patent No.: US 11,741,522 B2
(45) Date of Patent: Aug. 29, 2023

(54) METHOD FOR IMAGE PRODUCT RECOMMENDATION

(71) Applicant: KODAK ALARIS INC., Rochester, NY (US)

(72) Inventors: Alexander Loui, Rochester, NY (US); Madirakshi Das, Rochester, NY (US)

(73) Assignee: KODAK ALARIS, INC., Rochester, NY (US)

( * ) Notice: Subject to any disclaimer, the term of this patent is extended or adjusted under 35 U.S.C. 154(b) by 396 days.

(21) Appl. No.: 15/395,837

(22) Filed: Dec. 30, 2016

(65) Prior Publication Data
US 2017/0193588 A1 Jul. 6, 2017

Related U.S. Application Data

(60) Provisional application No. 62/273,641, filed on Dec. 31, 2015.

(51) Int. Cl.
*G06Q 30/0601* (2023.01)
*G06F 16/583* (2019.01)

(52) U.S. Cl.
CPC ....... *G06Q 30/0631* (2013.01); *G06F 16/583* (2019.01); *G06Q 30/0603* (2013.01);
(Continued)

(58) Field of Classification Search
CPC . G06Q 30/0601–0645; G06Q 30/0631; G06Q 30/0603; G06Q 30/0621; G06Q 30/0623; G06Q 30/0625; G06Q 30/0627; G06Q 30/0629; G06Q 30/0643; G06F 16/583
(Continued)

(56) References Cited

U.S. PATENT DOCUMENTS 8,611,677 B2 12/2013 Das
8,831,360 B2 9/2014 Cok
(Continued)

OTHER PUBLICATIONS

Roberts, Lindsey M. Here Are The Best Photo Books For All Those Pictures Languishing In Your Computer (And Phone). Aug. 13, 2014. Published by The Washington Post. (Year: 2014).*
(Continued)

*Primary Examiner* — Allison G Wood
(74) *Attorney, Agent, or Firm* — HOGAN LOVELLS US LLP

(57) ABSTRACT

Embodiments of the present disclosure a method for determining product relevancy including extracting metadata from an image file of a digital image collection, the metadata being indicative of at least one feature of the image file. The method includes creating an input profile corresponding to the metadata extracted from the image files of the digital image collection. The method includes comparing the input profile to a product profile, the product profile having one or more rules corresponding to a consumer product, wherein the rules are indicative of the requirements of the product. The method includes determining a match score, the match score indicative of a relevancy of the product profile to the input profile such that a high relevancy correlates to a consumer product that is suited to the input profile and a low relevancy correlates to the consumer product that is not suited to the input profile.

7 Claims, 14 Drawing Sheets

(52) U.S. Cl.
CPC ..... *G06Q 30/0621* (2013.01); *G06Q 30/0623* (2013.01); *G06Q 30/0625* (2013.01); *G06Q 30/0627* (2013.01); *G06Q 30/0629* (2013.01); *G06Q 30/0643* (2013.01)

(58) Field of Classification Search
USPC ................................................ 705/26.1–27.2
See application file for complete search history.

(56) References Cited

U.S. PATENT DOCUMENTS

| | | | |
|---|---|---|---|
| 8,756,114 B2 | 12/2014 | Fredlund | |
| 8,917,943 B2 | 12/2014 | Cok | |
| 8,934,717 B2 | 1/2015 | Newell | |
| 10,242,034 B1* | 3/2019 | Li | G06F 16/5866 |
| 10,282,431 B1* | 5/2019 | Bhotika | G06F 16/5838 |
| 2010/0036818 A1* | 2/2010 | Valencia-Campo | G06F 16/5838 |
| | | | 707/711 |
| 2013/0108179 A1* | 5/2013 | Marchesotti | G06T 11/60 |
| | | | 382/224 |
| 2014/0193047 A1* | 7/2014 | Grosz | G06Q 10/10 |
| | | | 382/118 |
| 2015/0058160 A1* | 2/2015 | Cao | G06Q 30/0631 |
| | | | 705/26.7 |
| 2015/0293688 A1* | 10/2015 | Han | G11B 27/034 |
| | | | 715/719 |
| 2017/0091847 A1* | 3/2017 | Cama | G06F 16/9535 |

OTHER PUBLICATIONS

Harkreader, Eric. Rite Aid Unveils New Photo Website Making It Easy To Order Prints And Create Unique Photo Gifts. Nov. 9, 2011. Published by Business Wire. (Year: 2011).*

* cited by examiner

| Image ID | Content-based features | Time-based features | Face-based features | Event-based features |
|---|---|---|---|---|
| Image_1 | Red, Blue, Yellow, Fall colors, Outdoors | Afternoon, Weekend | No Faces | Medium Duration, Vacation, Autumn, Lake George, NY |
| Image_2 | Red, Green, Mountains, Outdoors | " | " | " |
| Image_3 | Yellow, Vegetation | " | " | " |
| Image_4 | Red, Vegetation | " | " | " |
| Image_5 | Sand | " | Group of 2, AdultFemale, ChildFemale, MediumFaces, PersonA | " |
| Image_6 | Sand, Water, Beach | " | NoFaces | " |
| Image_7 | Sand, Water, Sky, Outdoors | " | GroupOf2, SeniorMale, SeniorFemale, MediumFaces, PersonB, PersonC | " |
| Image_8 | Sand, Water | " | 3OrMore, SeniorMale, SeniorFemale, ChildFemale, SmallFaces, PersonA, PersonB, PersonC | " |
| Image_9 | Red, Vegetation | " | GroupOf2, AdultMale, ChildFemale, MediumFaces, PersonA | " |
| Image_10 | --- | " | GroupOf2, SeniorMale, SeniorFemale, MediumFaces, PersonA | " |
| Image_11 | Sky, Outdoors | " | OnePerson, AdultFemale, MediumFaces | " |
| Image_12 | Mountains, Vegetation, Green, Orange | " | NoFaces | " |
| Image_13 | Water, Sky, Blue | " | NoFaces | " |
| Image_14 | Water, Mountains, Vegetation, Green, Orange | " | NoFaces | " |

FIG.6

| Image ID | Content-based features | Time-based features | Face-based features | Event-based |
|---|---|---|---|---|
| Image_1 | Red, Indoors | Morning, Weekend, Winter | 3OrMore, AdultMale, AdultMale, ChildFemale, MediumFaces | ShortDuration, SocialMoment, Home |
| Image_2 | Red, Green, Indoors | " | GroupOf2, ChildFemale, ChildMale, MediumFaces | " |
| Image_3 | Red, Indoors | " | 3OrMore, AdultMale, ChildFemale, ChildMale, MediumFaces | " |
| Image_4 | Green, Vegetation, Indoors | " | NoFaces | " |
| Image_5 | Red, Indoors | " | SinglePerson, LargeFaces, ChildFemale | " |
| Image_6 | Red, Indoors | " | GroupOf2, ChildFemale, ChildMale, LargeFaces | " |
| Image_7 | Snow, Sky, Outdoors | " | 3OrMore, AdultFemale, AdultFemale, ChildFemale | " |
| Image_8 | Snow, Sky, Outdoors | " | GroupOf2, AdultFemale, AdultFemale | " |

FIG.7

| Image ID | Content-based features | Time-based features | Face-based features | Event-based |
|---|---|---|---|---|
| Image_1 | Sky, Building, Outdoors | Morning, Weekday | 3OrMore, SmallFaces | LongDuration, Vacation, Orlando, FL |
| Image_30 | Yellow, Car, Outdoors | " | 3OrMore, Medium Faces | " |
| Image_50 | Sky, Building, Outdoors | Afternoon, Weekday | " | " |
| Image_75 | Sky, Water, Buildings, Outdoors | " | OnePerson, ChildFemale | " |
| Image_90 | " | " | 3OrMore, SmallFaces | " |
| Image_100 | NightScene | Night, Weekday | NoFaces | " |
| Image_125 | Blue, Sky, Amusement Park, Outdoors | Morning, Weekend | NoFaces | " |
| Image_140 | " | " | NoFaces | " |
| Image_160 | Outdoors | Evening, Weekend | 3OrMore, AdultMale, AdultFemale, ChildFemale, MediumFaces | " |
| Image_175 | Sky, Outdoors, Building | " | NoFaces | " |
| Image_190 | Indoors | " | 3OrMore, AdultMale, AdultFemale, MediumFaces | " |
| Image_210 | Vegetation, Green, Sky, Blue, Building | Morning, Weekend | NoFaces | " |
| Image_240 | Water, Sky, Blue, Amusement Park | " | OnePerson, ChildFemale | " |
| Image_260 | Outdoors, Blue, Sky, Buildings | " | 3OrMore, AdultMale, AdultFemale, ChildFemale | " |

FIG.8

| Product | Content-based features | Time-based features | Face-based features | Event-based |
|---|---|---|---|---|
| Christmas card | • Red (+1, -1)<br>• Green (+1, 0)<br>• Indoors (+1, 0) | FlashFired (+1, 0) | • GroupOf2 OR 3OrMore (+3, -2)<br>• Child (+1, 0)<br>• LargeFaces OR MediumFaces (+2, -1) | • SocialMoment (+5, 0)<br>• Home (+5, 0)<br>• Winter (+10, -10) |
| 5-image collage - fall motif | • Red OR Orange (+2, 0)<br>• Outdoors (+1, -1)<br>• Vegetation (+1, 0) | — | NOT LargeFaces (0, -1) | • ShortDuration OR MediumDuration (5, 0)<br>• Vacation (5, 0)<br>• 5 < NumberImages < 25 (+5, -5)<br>• Autumn (+10, -10) |
| 5-image collage - winter motif | • Snow (+2, -1)<br>• Outdoors (+1, 0) | NOT Night (0, -1) | • OnePerson OR GroupOf2 (+2,-2)<br>• Child (+1, 0)<br>• MediumFaces OR SmallFaces (+1, 0) | • ShortDuration Or MediumDuration (5, 0)<br>• 5 < NumberImages < 25 (+5, -5)<br>• Winter (+10, -10) |
| Coffee mug - baby motif | Blue OR Pink (+1, 0) | — | • OnePerson AND LargeFaces (+2, -1)<br>• Baby (+3, -3) | ShortDuration (+5, 0) |
| Coffee mug - family motif | — | — | • 3OrMore (+2, -2)<br>• MediumFaces OR LargeFaces (+2, -1)<br>• PersonA AND PersonB AND PersonC (+2, 0) | • ShortDuration (+5, 0)<br>• Celebration (+5, 0) |
| Photobook - Florida theme parks vacation motif | • Outdoors (+1, 0)<br>• Sky (+1, 0)<br>• Buildings (+1, 0)<br>• Amusement park (+1, 0) | — | • GroupOf2 OR 3OrMore (+3, -2)<br>• Child (+2, -1)<br>• MediumFaces OR SmallFaces (+1, 0) | • LongDuration (+10, -10)<br>• Vacation (+10, -10)<br>• Florida (+10, 0)<br>• NumberImages > 80 (10, -10) |
| Photobook - Southwest US vacation motif | • Outdoors (+2, -2)<br>• Blue AND Sky (+1, -1)<br>• Red AND Rocks (+2, -1)<br>• NOT Green (0, -1) | Morning OR Evening (+1, 0) | NoFaces (+2, -1) | • LongDuration (+10, -10)<br>• Vacation (+10, -10)<br>• NumberImages > 60 (+10, -10) |

FIG. 11

METHOD FOR IMAGE PRODUCT RECOMMENDATION

CROSS-REFERENCE TO RELATED APPLICATIONS

This application claims benefit of U.S. Provisional Application No. 62/273,641 filed Dec. 31, 2015, entitled "Method for Image Product Recommendation," the entirety of which is incorporated herein.

BACKGROUND OF THE INVENTION

1. Field of the Invention

The present invention relates to image processing and, more particularly, to suggesting products based on the contents of an image.

2. Description of Related Art

Consumer products may include items incorporating one or more images (e.g., photographs) captured by a consumer for personal or professional use. For example, the consumer product may include an image on a t-shirt, coffee mug, calendar, or the like. Moreover, collections of photographs may be organized and compiled in a photo album (e.g., a digital photo album, a digital slide show, a hard copy print out) for later viewing. Users may present images for processing (e.g., at a photo kiosk) and be presented with one or more options for additional products that may be purchased incorporating the images. For example, the kiosk may suggest placing an image on a t-shirt. However, often the suggestions are not relevant to the image. For example, the kiosk may suggest placing an unclear, out of focus image on the t-shirt, or to place an image that may not be very important to the consumer on the t-shirt. Additionally, the kiosk may suggest placing a collection of images in a photo book where the total number of images is too small to fill out the photo book. As a result, it is now known that a method for presenting relevant consumer products to users is desirable.

U.S. Pat. No. 8,934,717, issued Jan. 13, 2015, to Newell et al. describes a method for selecting the most suitable assets from an image collection, given an image product. The image product is either chosen by the user or picked by the system based on an "identified triggering event" such as Mother's Day or New Year's Day. For example, a collection of vacation images from a beach presented to the system before Mother's Day would be treated as content for a Mother's Day product even though they may not be relevant to that product, since no semantic analysis of the images is done to determine suitability.

U.S. Pat. No. 8,756,114, issued Jun. 17, 2014, to Fredlund et al. describes a method for generating a product recommendation using the user's images, but the rules used for recommending the product are based on user profile information, contextual information, triggering events etc. For example, a product offering may be based on the consumer being over a certain age, or consumer's interest in a particular hobby, or a current popular sporting event. However, this is an example of checking if a product can be generated, and not a method for optimizing the product selection to the image collection to produce a list of possible products, ranked by suitability to the given image collection, as disclosed in our application.

Cok has described associating an image-type distribution based on image content to a theme (e.g., birthday party) in U.S. Pat. No. 8,831,360 issued Sep. 9, 2014; and a method for matching images from a collection to the image-type distribution associated to the theme in U.S. Pat. No. 8,917,943 issued on Dec. 23, 2014. However, no method for the non-trivial step of automatic product selection or theme selection has been disclosed in either invention. Furthermore, it should be noted that the theme as described in these patents is not equivalent to a recommended product type (e.g., calendar, photobook, mug) as defined in the present invention.

In U.S. Pat. No. 8,611,677 issued Dec. 17, 2013, Das et al have described a method for classifying images or videos in a digital image collection into one of several event categories, using a combination of time-based and content-based features. The objective is to allow the consumer to search for and browse images in the collection depicting specific events, and using the event category labels to enable the automated generation of event-specific creative media outputs. Quoting from their disclosure "For example, a vacation in Europe will suggest the use of a relevant background design and theme that reflects the cultural and regional characteristic of the location where the event took place. A party event will evoke the use of a fun and whimsical theme and mood for the album." It is clear that the aim there is to use the event label(s) to select the appearance of an output composition using images in the event. This provides a useful template for constructing, for example, a particular page on a photobook. However, it does not teach how to recommend a specific product category such as a calendar, a photobook, or a collage, based on the semantic content or event information of the captured images.

BRIEF SUMMARY OF THE INVENTION

In an embodiment a method for determining product relevancy includes extracting metadata from an image file of a digital image collection, the metadata being indicative of at least one feature of the image file. The method also includes creating an input profile corresponding to the metadata extracted from the image files of the digital image collection. The method further includes comparing the input profile to a product profile, the product profile having one or more rules corresponding to a consumer product, wherein the rules are indicative of the requirements of the product. The method also includes determining a match score, the match score indicative of a relevancy of the product profile to the input profile such that a high relevancy correlates to a consumer product that is suited to the input profile and a low relevancy correlates to the consumer product that is not suited to the input profile.

In a further embodiment a method to determine and display relevant consumer products related to image files includes providing an image processing system to a user on a user computing device. The method also includes receiving the image files at a server, the server including one or more processors and a memory that stores product profiles related to consumer products. In embodiments, the one or more processors operate to produce, responsive to the received image files, an input profile defined at least in part by extracting metadata from the image files. The one or more processors also compare the input profile to the product profiles related to consumer products, the product profiles including one or more elements corresponding to the metadata of the input file. The one or more processors further determine a match score by applying a reward or penalty based on the correlation of the image profile to the product profile, the reward increasing the value of the match score. Also, the one or more processors output, to the image processing system, a list of the consumer products determined relevant to the input profile based on the value of the match score.

In an embodiment a non-transitory computer-readable medium with computer-executable instructions stored thereon executed by one or more processors to perform a method to determine relevancy of a consumer product based on an image file includes generating an input profile by extracting at least one metadata feature from the image file. The method also includes comparing the input profile to a product profile, the product profile having at least one element corresponding to the at least one metadata feature. The method further includes calculating a match score based on the comparison between the input profile and the product profile, wherein a positive comparison between the input profile and the product profile increases the value of the match score. The method also includes outputting a list of consumer products based on the value of the match score, the list comprising products having a respective match score above a threshold value.

BRIEF DESCRIPTION OF THE FIGURES

FIG. 6 is a table of an input profile;

FIG. 7 is an table of an input profile;

FIG. 8 is a table of an input profile;

FIG. 11 is a table of a product profile;

DETAILED DESCRIPTION OF THE INVENTION

Embodiments of the present disclosure include a method for evaluating and presenting a list of consumer products related to an image file or a collection of image files based on properties of the image file or collection of image files and the consumer products. For example, the method may evaluate metadata of the image file (both recorded and derived) to generate an image profile of the image file including information such as the time and date of creation, location, presence of human faces, and the like. Accordingly, the image profile includes one or more elements of the image file that may be evaluated against the consumer products to determine a relevant product based on the image profile. In certain embodiments, an input profile is generated by combining the image profiles from a collection of images. Consumer products available on the system are described by product profiles. For example, the product profile may include rules pertaining to theme elements, preferred number of photos, time of year, and the like to characterize the consumer product. Furthermore, the method includes comparing the input profile to the product profile and calculating a match score to determine if the product profile corresponds to a consumer product that is relevant to the given input profile. For example, the method may evaluate the input profile against the product profile and add weighted values to the match score when features desired in the product profile are present in the input profile, and to subtract weighted values to the match score when the features are not present in the input profile. As a result, the match score can be used to determine the relevance of the consumer product to the image files presented to the system. In this manner, the method may present only relevant consumer products for review to users.

Figure 1:
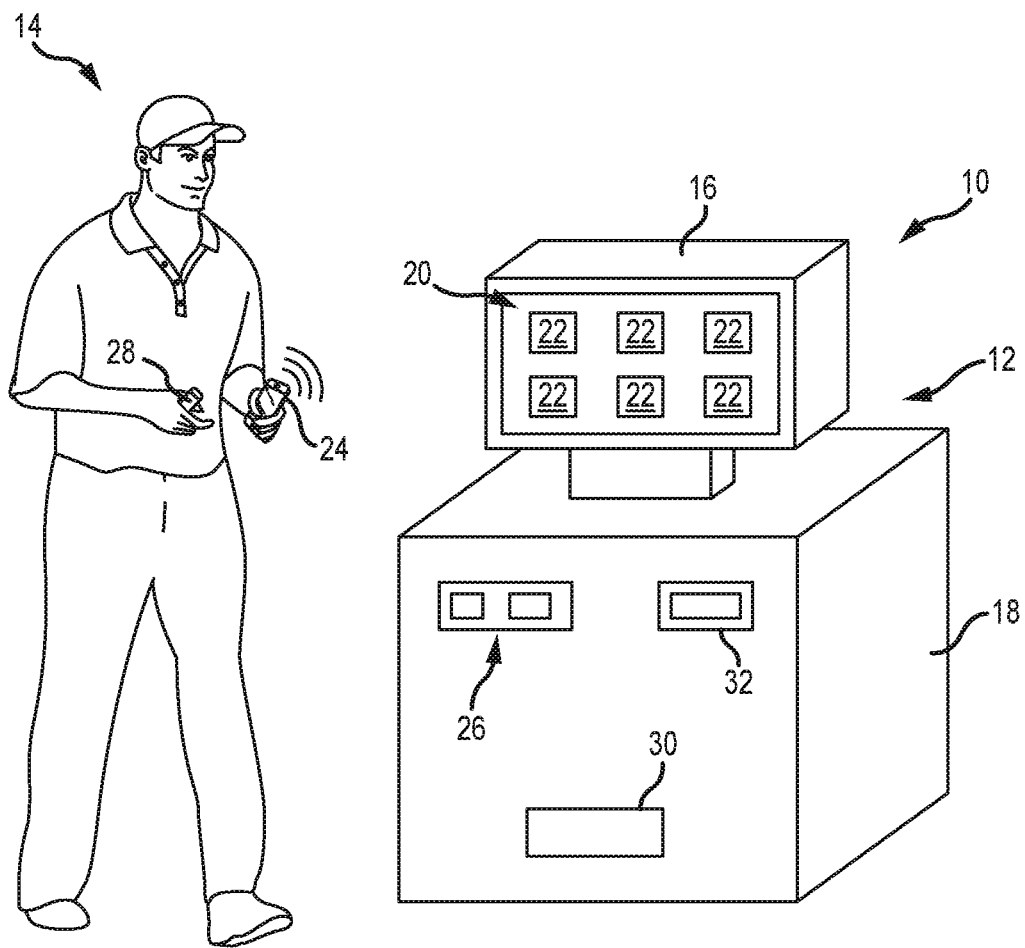
FIG. 1 is a perspective view of an embodiment of an image processing unit.

Turning to FIG. 1, a perspective view of an embodiment of an image processing unit 10 having an image processing system 12 being utilized by a user 14 (e.g., a consumer) is shown. The imaging processing unit 10 includes a display 16 arranged on top of a body 18. In the illustrated embodiment, the display 16 includes an interface 20 that receives inputs from the user 12 via a touch-screen. For example, as will be appreciated by one skilled in the art, the user 14 may touch one or more input buttons 22 to select a variety of options (e.g., input, payment, help, etc.). While the illustrated embodiment includes the touch-screen interface 20 on the display 16, in other embodiments the user 14 may utilize a personal electronic device 24 (e.g., a smartphone, a personal digital assistant, a remote, etc.) to interface with the image processing unit 10. For example, a personal electronic device 24 may include one or more programs (e.g., applications) having instructions that are executed by a readable memory of the personal electronic device 24 and interface with the image processing unit 10. In this manner, the user 14 may direct the image processing unit 10 to perform one or more pre-programmed tasks.

Returning to the body 18, a data port 26 is positioned on the body 18 and receives information related to images (e.g., photographs, videos, etc.). For example, the data port 26 (e.g., USB, SD-card, CD-ROM, etc.) may interface with a memory card 28 (e.g., flash memory, CD-ROM, etc.) when the memory card 28 is positioned into readable contact with the data port 26. Moreover, in certain embodiments, the data port 26 may include wireless data transfer capabilities (e.g., Wi-Fi, BLUETOOTH, 4G, cellular, etc.) to enable transfer to the data port 26 from the personal electronic device 24 without forming a physical connection with the data port 26. Further, in the illustrated embodiment, the body 18 includes a dispenser 30 to provide products to the user 14 and a payment module 32 to receive payment (e.g., cash, credit cards, wireless payment systems, etc.) from the user 14. In this manner, the user 14 may interface with the image processing unit 10 to provide images for processing.

Figure 2:
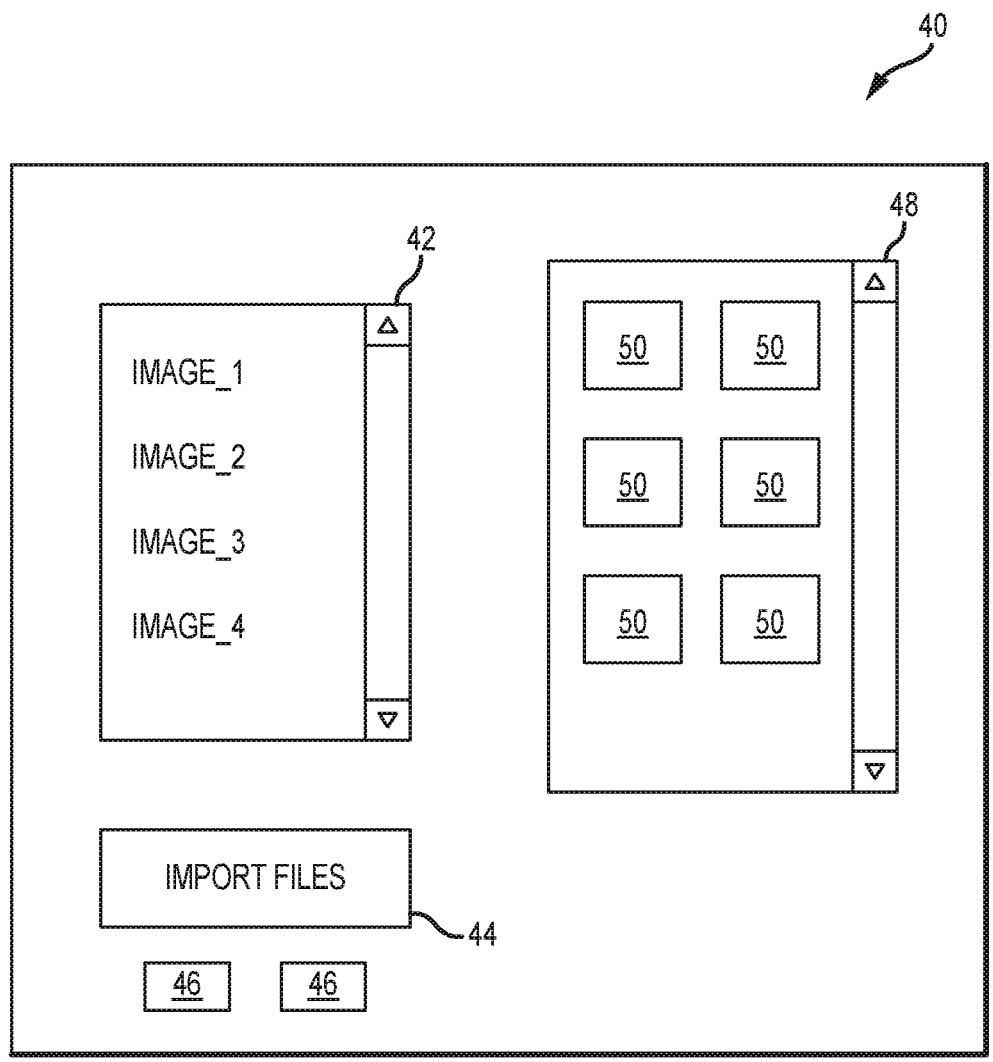
FIG. 2 is a schematic view of an embodiment of a user interface.

FIG. 2 is a schematic view of an embodiment of a user interface 40 for uploading photos for analysis by the image processing system 12. In certain embodiments, the user interface 40 may be utilized by the display 16 of the image processing unit 10. However, while FIG. 1 illustrated an image processing unit 10 (e.g., a kiosk) for receiving and processing the images, in other embodiments the user 14 may interact with the user interface 40 away from the image processing unit 10. For example, the user interface 40 may be an embodiment of a web site for receiving the image files for later processing. Furthermore, in certain embodiments, the user interface 40 may correspond to an application loaded on to the personal electronic device 24 to enable the user 14 to upload the prepare photos for later use via the image processing unit 10, a photo processing center, or electronically.

In the illustrated embodiment, the user interface 40 includes an image window 42 that includes a list of image files currently added (e.g., uploaded to) the image processing system 12. For example, the image files may be uploaded via the input button 44 which may receive the files from the user's hard drive (e.g., RAM, ROM, optical discs, flash memory, etc.), the personal electronic device 24, the memory card 28, or the like. Further, the image processing system 12 may receive the image files from social media sites (e.g., FACEBOOK, INSTAGRAM, TWITTER, and the like) via linking buttons 46 that direct the user 14 to enable access to the respective social media site. Accordingly, image files may be added (e.g., interfaced with, uploaded to) the image processing system 12 without being stored on local memory, thereby increasing the convenience and access of the image processing system 12 to the user 14.

In the illustrated embodiment, the user interface 40 includes a product window 48 to display consumer products 50 that may be selected by the user 14 for purchase and/or interactive use. For example, the products may include photo albums, social media banners, greeting cards, birth announcements, or the like and include one or more of the image files uploaded to the image window 42. As will be discussed in detail below, the image processing system 12 evaluates the image files to generate an input profile 110 to compare with a product profile corresponding to the products 50. By comparing the input profile to the product profile, the products 50 in the product window 48 may be arranged such that the most relevant (e.g., products 50 most likely to be used and/or purchased by the user 14) are arranged first. As a result, the user 14 may be more likely to utilize and/or purchase the products 50 because the user 14 will not search through several products 50 which do not correspond to the uploaded image file. Moreover, the products 50 may be specifically tailored to the image files (e.g., similar themes), and thereby provide the user 14 with ideas and/or options to display or use the image files.

Figure 3:
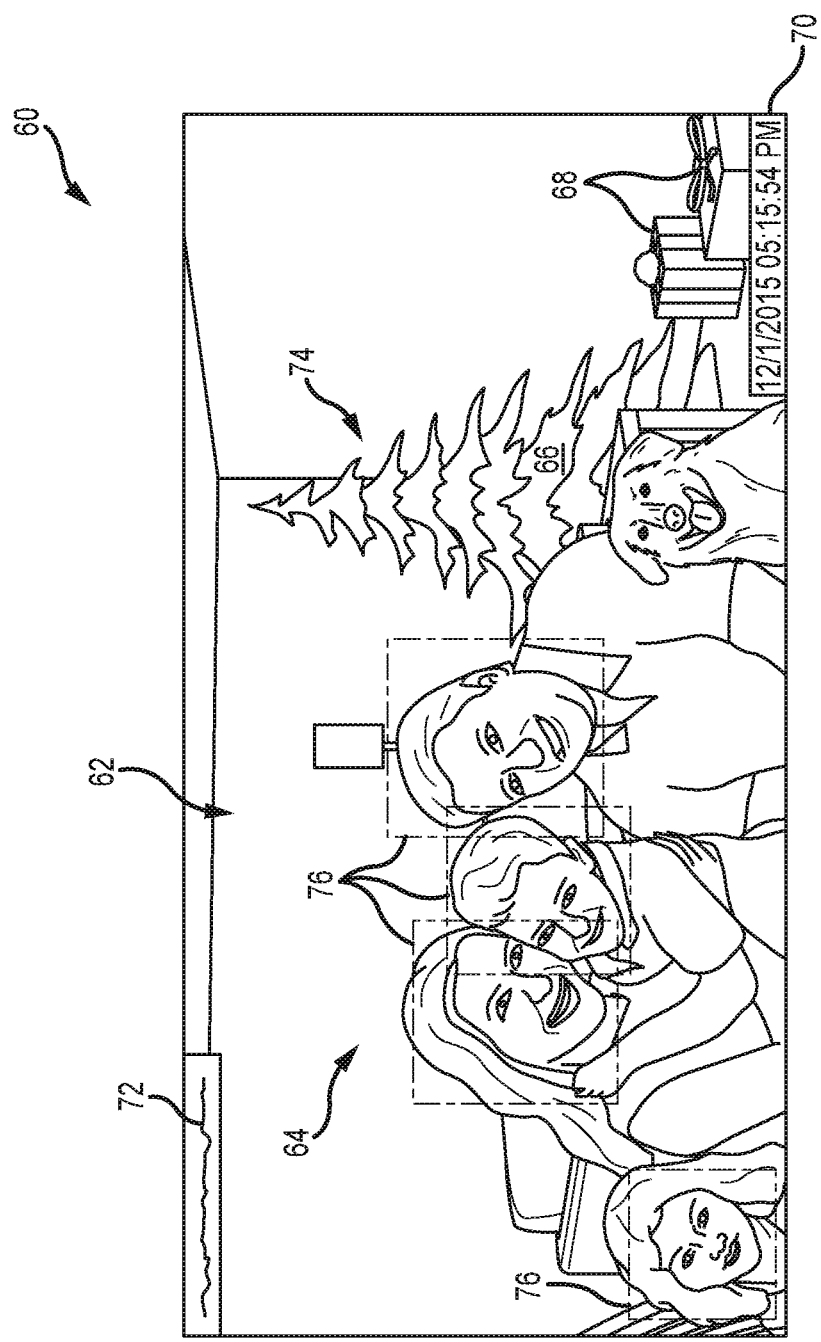
FIG. 3 is a schematic view of an embodiment of an image file containing a photographic image, in accordance with the present disclosure.

FIG. 3 is a schematic view of an embodiment of an image file 60 formed at least in part by a still photographic image 62. In the illustrated embodiment, the still photographic image 62 depicts a family 64 positioned near a Christmas tree 66. As shown, the family 64 includes four humans and one animal. Further, the depicted photographic image 62 includes presents 68 under the Christmas tree 66. However, in the illustrated embodiment, the image file 60 includes more than the photographic image 62. For example, the image file 60 includes metadata correlating a variety of information such as time, date, GPS location, image quality, camera-type used to create the image file 60, and the like. In the illustrated embodiment, time and date metadata 70 is positioned at the bottom right corner of the photographic image 62. Further, in certain embodiments, the image file 60 includes location metadata 72. The location metadata 72 may include GPS coordinates related to the location where the photographic image 62 was taken. In the illustrated embodiment, the location metadata 72 is depicted in the top left corner, however, the location metadata 72, as well as the time and date metadata 70, may not be physically visible on the photographic image 62. That is, the time and data metadata 70 and the location metadata 72 may be electronically embedded in the image file 60. As such, the time and date metadata 70 and the location metadata 72 may be referred to as recorded metadata (e.g., capture-based metadata) because the information is recorded by the image file 60 at the time the image file 60 is generated.

Moreover, derived metadata may be obtained from analysis of the photographic image 62. As used herein, derived metadata refers to information obtained from analyzing one or more areas of the photographic image 62 for one or more distinguishing features. In the illustrated embodiment, derived metadata includes at least content-based metadata, face-based metadata, and event-based metadata. As will be described below, derived metadata may be combined with recorded metadata to generate an image profile related to the image file 60.

Content-based metadata 74 refers to features that are computed from image pixels and that are intended to be an indicator of image content. In other words, evaluation of content-based metadata utilizes analysis of the image pixels forming the photographic image 62 of the image file 62 to extract features indicative of one or more characterizing content profiles. For example, content-based metadata 74 may be related to the background and/or scenery of the photographic image 62. As such, photographic images of leaves, mountains, a beach scene, or the like may be extracted and analyzed utilizing content-based metadata. Such techniques have been described in commonly assigned U.S. Pat. No. 6,504,951 and U.S. Patent Publication No. 2005/0105776, both of which are hereby incorporated by reference in their entireties.

In the illustrated embodiment, content-based metadata 74 may be derived from the image pixels of the photographic image 62. For example, the Christmas tree 66 may be extracted from the image pixels and analyzed. Further, other features of the background 70 may be evaluated to determine the context of the photographic image 62 (e.g., indoors, outdoors, holiday decorations, morning, evening, etc.). In the illustrated embodiment, analysis of the Christmas tree 66, among other features, may enable the content-based metadata 74 to determine the photographic image 62 is an indoor photograph and a holiday scene.

Face-based metadata refers to analysis and detection of human faces from image pixels. For example, in the illustrated embodiment, face-based metadata 76 extracts the faces of the four human beings in the photographic image 62. As such, the later generated image profile may include information indicative that the image file 60 contains at least one human face. Face detection algorithms and methods for detecting human faces are well known in the art of digital processing and therefore are not discussed in greater detail.

Event-based metadata refers to features of the image file 60 detected on an event level. For example, the event level may include the temporal duration of the event, the number of images in the event (e.g., via analysis of a photo album created on social media, via analysis of several image files 60 created over a time period), event user tags (e.g., via analysis of hash tags or captions on social media), event category information, or the like. Moreover, the event-based metadata may utilize the time and data metadata 70 to analyze the time of year of the event to correlate the event to known holidays. For example, image files 60 generated on December 25 may be indicative of photographs associated with Christmas. Accordingly, event-based metadata may be utilized to form the image profile.

Figure 4:
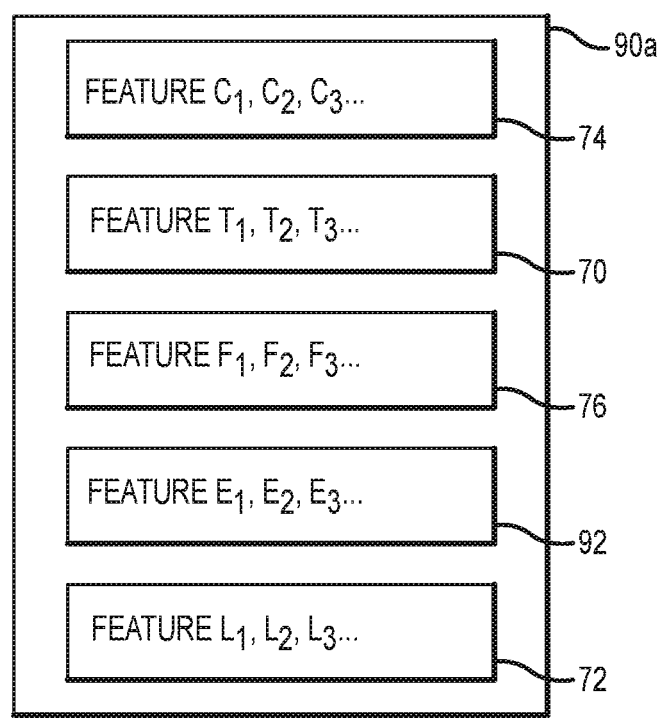
FIG. 4 is a schematic diagram of an embodiment of an image profile.

FIG. 4 is a schematic diagram of an embodiment of an image profile 90 generated by the image processing system 12 after analyzing the image file 60. In certain embodiments, the image profile 90 consists of an aggregate of the recorded metadata and the derived metadata for each image file 60. That is, the image profile 90 includes the features extracted from the image pixels while the image file 60 is analyzed by the image processing system 12. In the illustrated embodiment, the image profile 90a may correlate to analysis performed of an individual image file 60. For example, for the photographic image 62 depicted in FIG. 3, the image profile 90a may include features extracted from the image file 60 corresponding to the time and data metadata 70, the location metadata 72, the content-based metadata 74, the face-based metadata 76, and event-based meta-data 92. Accordingly, the image profile 90a for a given image file 60 corresponding to a photograph or video includes at least one feature extracted from the image file 60 corresponding at least in part to the derived metadata or the recorded metadata.

In certain embodiments, each individual image file 60 may have the image profile 90 associated with the given image file 60. However, in embodiments where large numbers of image files 60 are analyzed (e.g., 100 image files, 500 image files, 1000 image files, etc.), the image processing system 12 may arrange the image files 60 into one or more relational databases of image profiles 90 correlated to an input profile. As will be described below, by querying a database containing the image profiles, processing resources may be conserved because certain image profiles within the input profile may not be evaluated if they do not correspond to (e.g., match) the query. Furthermore, in certain embodiments, user inputs may be utilized to form at least a portion of the image profile 90. For example, the image processing system 12 may prompt the user to input information regarding desirable products, such as age of the recipient, culture of the recipient, and the like. These inputs may be utilized to determine suitable consumer products via the image processing system 12.

Figure 5:
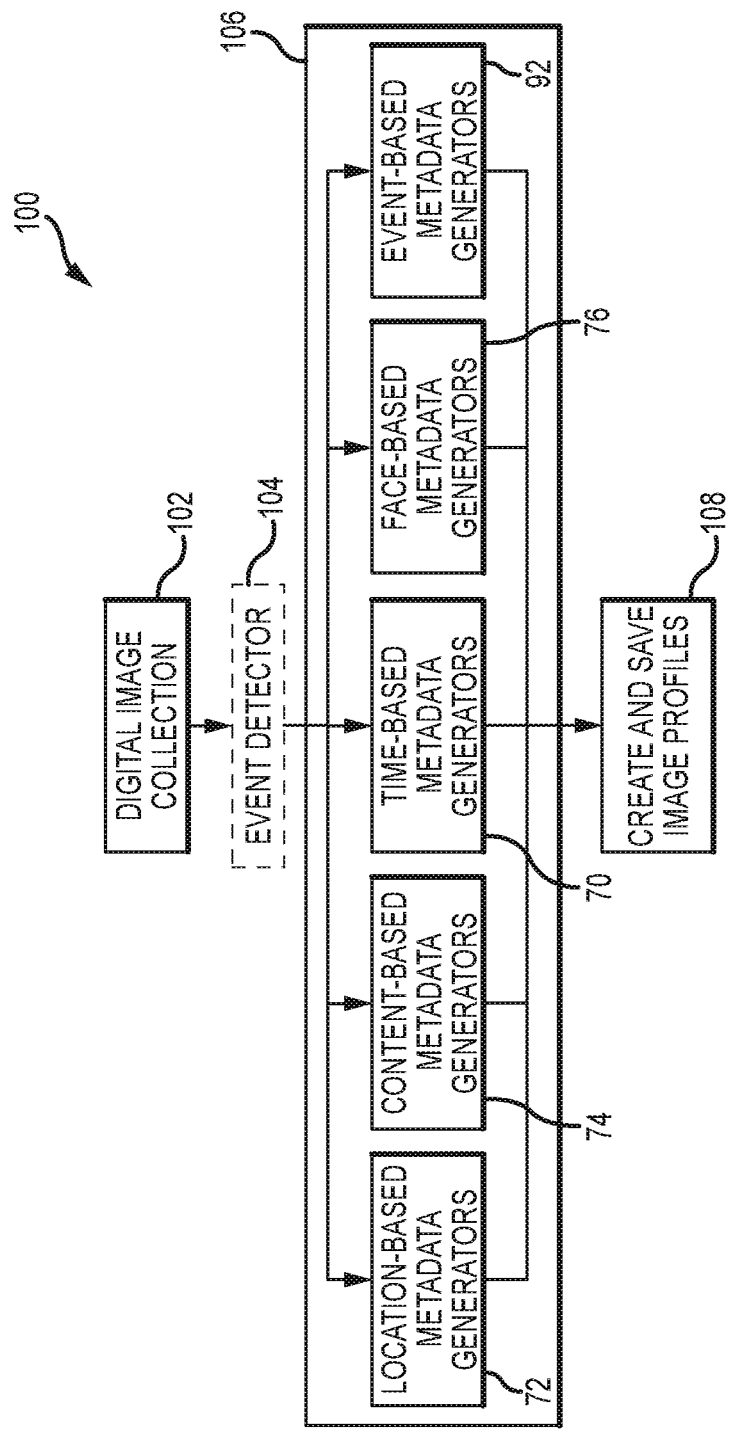
FIG. 5 is a flow chart of an embodiment of an image file evaluation method.

FIG. 5 is a flow chart of an embodiment of a method 100 for extracting metadata from a digital image collection 102 (e.g., one or more image files 60). The digital image collection is processed by an event detector (block 104). For example, the event detector clusters images based on the same event via algorithms, as disclosed in commonly assigned U.S. Pat. Nos. 6,606,411 and 6,351,556, each of which are hereby incorporated by reference in its entirety. As such, the event detector may be utilized to generate the databases described above. It should be noted that in certain embodiments, the method 100 may eliminate block 104. Subsequently, the digital image collection 102 undergoes metadata analysis (block 106). For example, in the illustrated embodiment, metadata analysis includes evaluating the digital image collection 102 for, at least in part, the time and date metadata 70, location metadata 72, content-based metadata 74, face-based metadata 76, and event-based metadata 92. However, it is appreciated that additional analysis may be performed and utilized to generate the image profiles 90. For example, the image quality may be evaluated to determine whether enlarging the photographic image 62 would be appropriate without distortion and/or sacrifices to clarity. The metadata extracted from the image files 60 is output and saved (block 108) as image profiles 90. That is, target metadata may be extracted from the image files 60 to generate the image profiles 90. In this manner, the metadata may be saved to an image profile 90 correlating to features present in the photographic image 62 of the image file 60. In certain embodiments, the image profiles 90 from a collection of images are combined and saved as an input profile 110. Additionally, in certain embodiments, the image profiles 90 of individual image files 60 may be compiled into a database (e.g., a relational database) for further analysis. As will be described below, with large numbers of image files 60, arranging the image profiles 90 into databases may conserve computing resources because the database may be queried and only image profiles 90 within the input profile corresponding to the query may be analyzed by the image processing system 12. Accordingly, the method 100 enables the image processing system 12 to analyze incoming data image collections 102 (e.g., collections of image files 60, collections of video files, combinations of image files 60 and video files) for processing and evaluation for consumer product suggestion.

FIG. 6 is a table of an embodiment of an input profile 110 containing a set of image profiles 90. As used herein, input profile 110 refers to a set of image profiles 90 associated with images presented by the user 14 to the system 12. In the illustrated embodiment, a first column 112 includes an image identifier, a second column 114 includes features correlated to content-based metadata 74, a third column 116 includes features correlated to time-based metadata 70, a fourth column 118 includes features correlated to face-based metadata 76, and a fifth column 119 includes features correlated to event-based metadata 92. By way of example only, in the illustrated embodiment, the image files 60 may be related to a day trip at a lake to see fall foliage. As a result, the content-based metadata 74 may extract colors (e.g., red, blue yellow, fall colors), natural features (e.g., mountains, vegetation, sky, beach), and/or other features, such as indications of the outdoors and nature generally. Accordingly, for example, the event detector 104 may determine the collection of images as relates to a similar event at a similar location. Moreover, as illustrated in the input profile 110, other metadata features may be extracted from the image files, such as the time-based metadata 70 (e.g., afternoon), the face-based metadata 76 (e.g., adult female, child female, group of 2), and/or the event-based metadata 92 (e.g., vacation, autumn, Lake George, N.Y.). It should be appreciated that while the illustrated embodiment includes 14 images in the input profile 110, in other embodiments, more of fewer images may be arranged into the input profile 110. For example, the input profile 110 may include 10, 20, 100, 200, 300, 400, 500, one thousand, ten thousand, or any other number of images. As described above, arranging the image profiles 90 in the input profile 110 enables the image processing system 12 to query the database of images in the input profile 110 to extract specific image files corresponding to particular requests. For example, a query evaluating the input profile 110 for the color yellow may return Image_1 and Image_3, in the illustrated embodiment. As a result, computing resources may be saved because each image file of the input profile 110 not corresponding the query may not undergo additional analysis.

FIG. 7 is a table of an embodiment of the input profile 110. By way of example only, the input profile 110 in FIG. 7 corresponds to a collection of image files 60 created in mid-December, before the Christmas holidays. For example, the photographic image 62 of FIG. 3 may be included in the digital image collection 102 utilized to generate the input profile 110. As shown, each image file 60 includes metadata features, such as content-based metadata 74 (e.g., red, indoors), time and data metadata 70 (e.g., morning, weekend, winter), face-based metadata 76 (e.g., 3 or more, adult male, child female), and event-based metadata 92 (e.g., short duration, social moment, home). As such, the individual image profiles 90 for the respective image files 60 may be arranged into the input profile 110 for evaluation by the image processing system 12.

FIG. 8 is a table of an embodiment of the input profile 110. In the illustrated embodiment, the input profile 110 includes over two hundred image files 60. However, as described above, in other embodiments the input profile 110 may include more or fewer image files 60. As shown, the image files 60 incorporated with the input profile 110 are selected from the digital image collection 102 including at least 260 images, because the first image file 60 is listed as Image_1 and the last image file 60 is listed as Image_260. By way of example only, in the illustrated embodiment, the image files 60 are from a family vacation at an amusement park in Orlando, Fla. As shown, by evaluating the image files 60, the input profile 110 includes metadata corresponding to content-based metadata 74, time and date metadata 70, face-based metadata 76, and event-based metadata 92. For example, Image_1 includes features such as sky, buildings, the outdoors, morning, weekday, 3 or more faces, small faces, child female faces, and a location in Orlando, Fla. In this manner, the input profiles 110 may contain the metadata for multiple image files 60 for evaluation by the image processing system 10.

Figure 9:
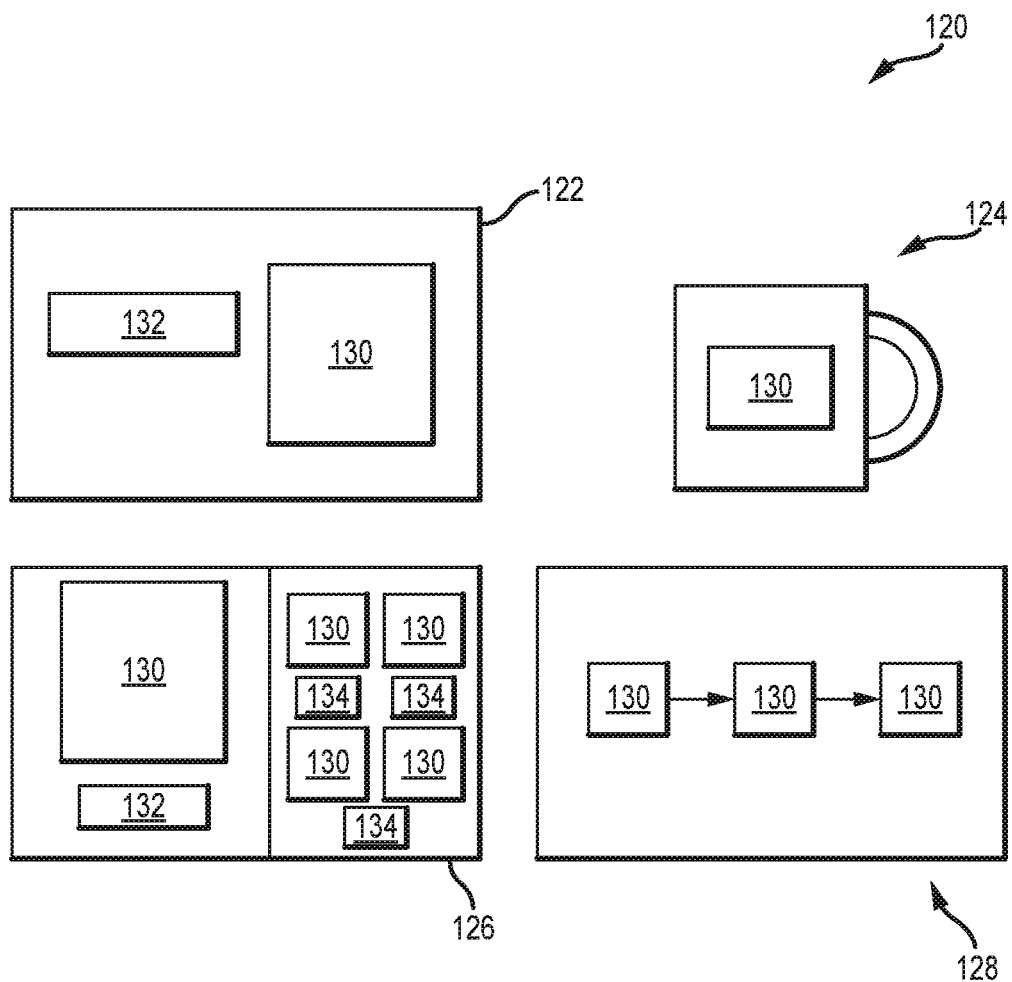
FIG. 9 is a schematic view of an embodiment of consumer products.

FIG. 9 is a schematic view of an embodiment of a collection of consumer products 120 that may be sold by and/or electronically generated by the image processing system 12. For example, the consumer products 120 may be ordered from the image processing unit 10 and/or from a web site incorporating the image processing system 12. In certain embodiments, the consumer products 120 may be physical goods, such as cards, photo albums, coffee cups, t-shirts, or the like. Further, in certain embodiments, the consumer products 120 may be electronic goods such as e-cards, slide shows, digital advertisements, or the like. Therefore, as used herein, consumer products 120 refers to any physical or electronic item that may incorporate one or more image files 60 and/or video files.

In the illustrated embodiment, the consumer products 120 include a card 122 (e.g., a Christmas card, a wedding announcement, a birth announcement, a birthday card, etc.), a coffee cup 124, a photo book 126, and a slide show 128. However, other products 120 including calendars, posters, and the like may also be provided. As described above, the image processing system 12 incorporates product profiles corresponding to the consumer products 120. For example, the image processing system 12 may include pre-loaded instructions for each of the consumer products 120 available via the image processing system 12. Further, in certain embodiments, the image processing system 12 may analyze the consumer products 120 and generate a series of rules and/or features indicative of the consumer products 120. That is, the image processing system 12 may extract data from the products 120 which correlate to features of image files. As such, the consumer products 120 may be compared to the image profiles 90 to determine suitable consumer products 120 based on the image profiles 90.

For example, in the illustrated embodiment, the card 122 may include a photographic space 130 to include the photographic image 62 of the image file 60. Furthermore, the card 122 may include a text space 132 corresponding to a message being relayed by the card 122. In the illustrated embodiment, the card 122 is a Christmas card and, as a result, the photographic space 130 may correspond to the photographic image 62 including certain properties related to Christmas, such as a Christmas tree, a group of human beings, the color red, gifts, and the like. As will be described below, the features corresponding to the card 122 may be translated as a set of rules and/or weighing factors to be compared to the image profiles 90.

Still further, the coffee cup 124 includes the photographic space 130. In certain embodiments, the photographic space 130 on the coffee cup 124 may correspond to certain properties of the image file 60, such as a human face, a nature scene, or the like. As such, the product profile for the coffee cup 124 may be established to evaluate the image profile 90 for the above-mentioned features.

Moreover, the illustrated photo book 126 includes photographic spaces 130 and text spaces 132. For example, the photographic spaces 130 may include photographic images 62 related to one another via the location metadata 72. That is, the photographic images 62 may all be taken at the same location (e.g., during the same event), thereby providing cohesion and unity to the photo book 126. Furthermore, the illustrated photo book 126 includes theme elements 134. The theme elements 134 are related to the photographic images 62, thereby further bringing unity to the photo book 126. For example, if each photographic image 62 includes photographic images 62 having location metadata 72 indicative of a theme park (e.g., DISNEY WORLD, SIX FLAGS, etc.), then the theme elements 134 may corresponding to the theme park (e.g., characters, colors, etc.). As a result, the photo book 126 is more relevant to the needs of the user 14 because the theme shown in the photographic images 62 is also reflected on the pages via the theme elements 134. Additionally, the product profile related to the photo book 126 may include the theme elements 134 as a factor when evaluating respective image profiles 90.

In the illustrated embodiment, the slide show 128 includes three photographic images 62. As will be appreciated, the photographic images 62 may be related to one another to form a unified, coherent theme throughout the slide show. For example, the product profile related to the slide show 128 may evaluate the time and data metadata 70 of the image files 60 to place the photographic images 62 in sequential order, thereby illustrating the progression of an event over time. Further, because the slide show 128 includes more than one image file 60, the image processing system 12 may exclude the slide show 128 as an option when only one image file 60 is being evaluated. As a result, more relevant consumer products 120 may be displayed to the user 14.

Figure 10:
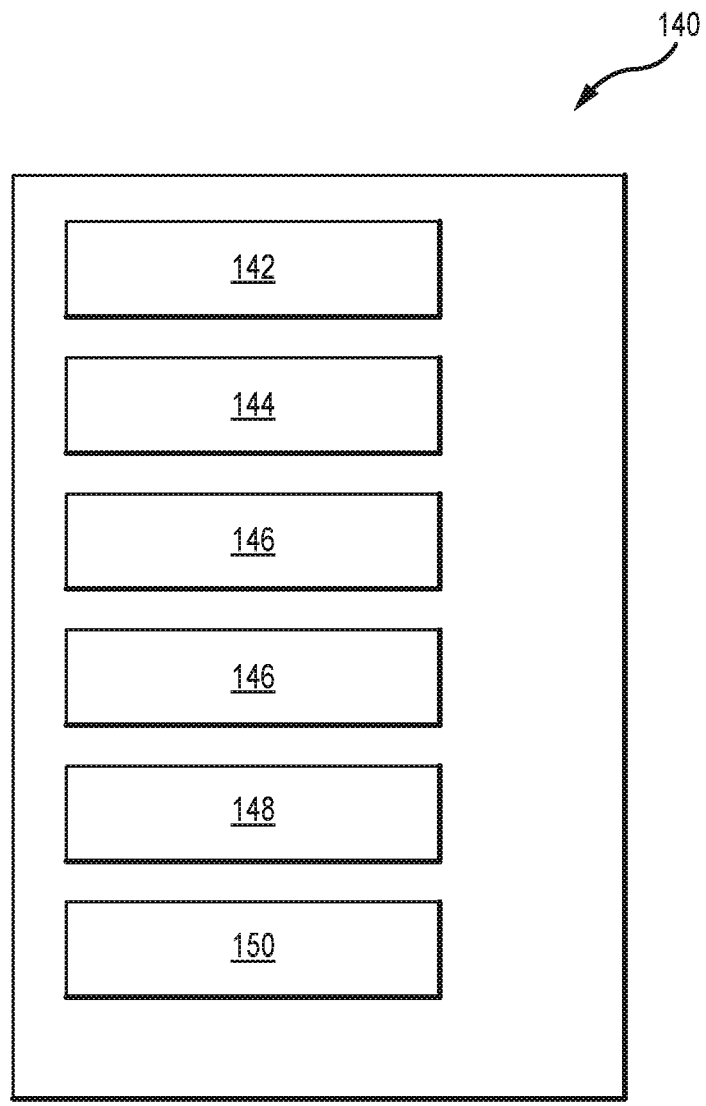
FIG. 10 is a schematic diagram of an embodiment of a product profile.

FIG. 10 is a schematic diagram of an embodiment of a product profile 140 corresponding to one or more consumer products 120. As used herein, the product profile 140 refers to a series of rules and/or elements (e.g., features) corresponding to one or more consumer products 120. For example, the product profile 140 for a given consumer product 120 may correlate to elements (e.g., colors, images, scenery, time of year, holiday, etc.) related to the consumer product 120. As will be described below, evaluating the image files 60 against the product profiles 140 enables the image processing system 12 to present the most relevant consumer products 120 to the user 14, thereby improving sales of the consumer products 120 and reducing the frustration and difficulty to the users 14 of looking through consumer products 120 that may not be relevant to given image files 60.

In the illustrated embodiment, the product profile 140 includes rules correlating to the metadata (e.g., derived and recorded) that may be extracted from the image files 60. For example, in the illustrated embodiment, a first rule 142 correlates to time and date metadata 70. In certain embodiments, the first rule 142 may be a threshold. For example, if the product profile 140 is directed toward a Christmas card, the first rule 142 may compare (e.g., via instructions executable on a memory via a processor) the time of year the image file 60 was created because image files 60 created in the summer months (e.g., June, July, and August in the Northern Hemisphere) generally do not correlate to Christmas cards. Further, in other embodiments, the first rule 142 may evaluate the time of the year when the consumer product 120 is being requested. Returning to the example of the Christmas card consumer product 122, the first rule 142 may determine that the Christmas card consumer product 122 may not be relevant to the user 14 in February because it would be approximately ten months before Christmas. Accordingly, the first rule 142 may evaluate time and date metadata 70 and/or information regarding the date of purchase to determine whether the consumer product 120 corresponding to the product profile 140 is relevant to the user 14.

In the illustrated embodiment, a second rule 144 correlates to location metadata 72. For example, the location metadata 72 may look at GPS locations of the image file 60 to determine where the photograph was taken. In certain embodiments, location metadata 72 proximate popular vacation sites (e.g., theme parks, skiing destinations, beaches, tourist attractions, etc.) may correlate to product profiles 140 for items related to vacations, such as photo books 146. Additionally, several image files 60 of the digital image collection 102 located in the same area may be indicative that the image files 60 correspond to a similar event (e.g., a party, a sporting event, etc.) and, as a result, consumer products 120 which include multiple photographic images (e.g., calendars, photo books, slide shows) may correlated to the image files 60 better than consumer products 120 which include single images (e.g., t-shirts, coffee cups 124, etc.) In this manner, the location metadata may be utilized to provide relevant consumer products 120 to users 14.

Furthermore, a third rule 146 correlates to content-based metadata 70. For example, the content-based metadata 70 may look at elements in the photographic image 62 to provide context to the photographic image 62. In certain embodiments, elements extracted by the content-based metadata 70 such as holiday decorations, beach scenery, or the like may correlate to product profiles 140 for items related to the elements. By matching corresponding content-based metadata 70 with product profiles 140, specific consumer products 120 having similar themes may be provided to the user 14. For example, content-based metadata 70 having information identifying mountains and ski-lifts may be utilized to suggest consumer products 140 having a skiing theme. In this manner, the relevance of the consumer products 120 presented to the user 14 may be improved.

In the illustrated embodiment, a fourth rule 148 correlates to face-based metadata 76. For example, the face-based metadata 76 may identify the number of human faces present in the photographic image 62. In certain embodiments, face-based metadata 76 may be indicative of events associated with the product profiles 140. For example, face-based metadata 76 identifying several human faces may be indicative of a group gathering or a party. As a result, consumer products 120 associated with large gatherings, such as posters or collages, may be suggested by the image processing system 12 due to the face-based metadata 76. Furthermore, consumer products 120 that do not typically include human faces (e.g., landscape photographic posters) may not be presented to the user 14.

Moreover, a fifth rule 150 correlates to event-based metadata 92, in the illustrated embodiment. In certain embodiments, user generated tags (e.g., hash tags, captions, etc.) may provide an indication as to the event or occasion for the photo. For example, event-based metadata 92 identifying hash tags related to a sporting event may be indicative of a theme or product associated with the sporting event (e.g., the specific sports team, the specific sport, etc.). Thereafter, product profiles 140 corresponding to the theme associated with the event-based metadata 92 may be presented to the user 14. As such, the user 14 has faster access to relevant consumer products 120.

Furthermore, it should be appreciated that other rules and types of analysis may be performed in generating the image profiles 90 and/or the product profiles 140. For example, as described above, user inputs may be utilized to form at least a portion of the image profile 90. Further, the product profile 140 may include one or more conditions or events corresponding to the user inputs. For example, the product profile 140 may include cultural considerations, as described in application Ser. No. 15/167,327, filed May 27, 2016, entitled "Cross cultural greeting system," which is hereby incorporated by reference. The product profile 140 may evaluate the user inputs to suggest products that would be pleasing and/or not offensive to different cultures. Additionally, other elements and factors may be evaluated. For example, if the digital image collection 102 included three photographs, the product profile 140 associated with a calendar would not be recommended because calendars typically include at least twelve photographs. Moreover, in certain embodiments, the image processing system 12 may analyze social media, appointment calendars, or the like to determine upcoming events (e.g., holidays, birthdays, etc.) to provide improved selections to the user. In this manner, several properties of the image files 60 and/or the consumer products 120 may be utilized to identify relevant consumer products 120 for the user 14.

As described above, in the illustrated embodiment, the product profile 140 includes the first, second, third, fourth, and fifth rules 142, 144, 146, 148, 150 that are compared to the image file 60 to determine relevant consumer products 120. However, more or fewer rules may be utilized. In certain embodiments, the rules correlate to a weighing system that adds or subtracts points based on the result of the evaluation. For example, the rules may be Boolean statements evaluating to TRUE/FALSE (e.g., determine whether an element is included or not) to determine whether to add points (e.g., a reward) or to subtract points (e.g., a penalty) when determining which consumer products 120 are most relevant to the image files 60. For example, the first rule 142 may evaluate whether the image file 60 was created in October, November, or December when evaluating if the image file 60 is appropriate for a Christmas card. Upon evaluation, an answer of TRUE (e.g., yes) may add a reward (e.g., 1 point) to the weighing system to determine whether the product profile 140 is relevant for the image file 60. As will be appreciated, there may be more than five rules associated with each product profile 140. For example, certain product profiles 140 may include 1, 2, 3, 4, 6, 7, 8, 9, 10, 20, 30, 40, 50, or any suitable number of rules. Further, the rewards and penalties associated with the rules may be varied according to importance of the rule to the associated product 120. For example, the product profile 140 associated with the Christmas card 122 may place more weight on the presence of a Christmas tree or snow in the image file 60. As such, the product profile 140 may be utilized by the image processing system 12 to evaluate consumer products 120 which may be relevant to given image files 60. Moreover, in certain embodiments, the rules may be linked. That is, a TRUE result for two rules may be associated with a higher reward because two factors may be more closely linked to the product profile 140 than individual factors.

FIG. 11 is a table of an embodiment of a catalog of product profiles 140. By way of example only, the catalog includes product profiles 140 corresponding to seven different consumer products 120. For example, in the illustrated embodiment, the catalog includes a product profile 140 for a Christmas card 151, a 5-image collage with a fall motif 152, a 5-image collage with a winter motif 153, a coffee mug with a baby motif 154, a coffee mug with a family motif 155, a photo book with a Florida theme parks vacation motif 156, and a photo book with a Southwest US vacation motif 157. As described above, each product profile 140 has rules corresponding to the content-based metadata 74, the time and data metadata 70, the face-based metadata 76, and the event-based metadata 92. For example, the Christmas card 151 includes rules based on content-based metadata 74 related to the color red, the color green, and the indoors. As shown, the red is weighted with (+1, −1), indicating that a TRUE response to the query whether red is present in the image file adds one to a match score, while a FALSE response subtracts one from the match score. In this manner, each rule based on metadata features for each product profile 140 of a consumer product 120 may be evaluated against the input profile 110 (e.g., a database containing one or more image profiles 90) to determine a match score indicating the most relevant product for the input profile 110. For example, the input profile 110 shown in FIG. 6 containing fourteen image profiles 90 of a fall foliage outing may correspond strongly to the 5-image collage with a fall motif 152. As a result, upon evaluation, the 5-image collage with a fall motif 152 may be determined to be the most relevant consumer product 120 for the input profile 110 based on having the highest match score among the products in the catalog.

As can be seen in the example presented in FIG. 11, different metadata features may be more strongly weighed than other features. For example, with respect to the Christmas card 151, the face-based metadata 76 feature corresponding to Groups of Three or More is weighted (+3, −2), indicating that three or more faces adds three to the match score, while less than three faces subtracts 2. In this manner, different features may be weighed more heavily to better correlate the features of the image files 60 to the consumer products 120, thereby improving the relevance the consumer product 120 has to the various image files 60.

Figure 12:
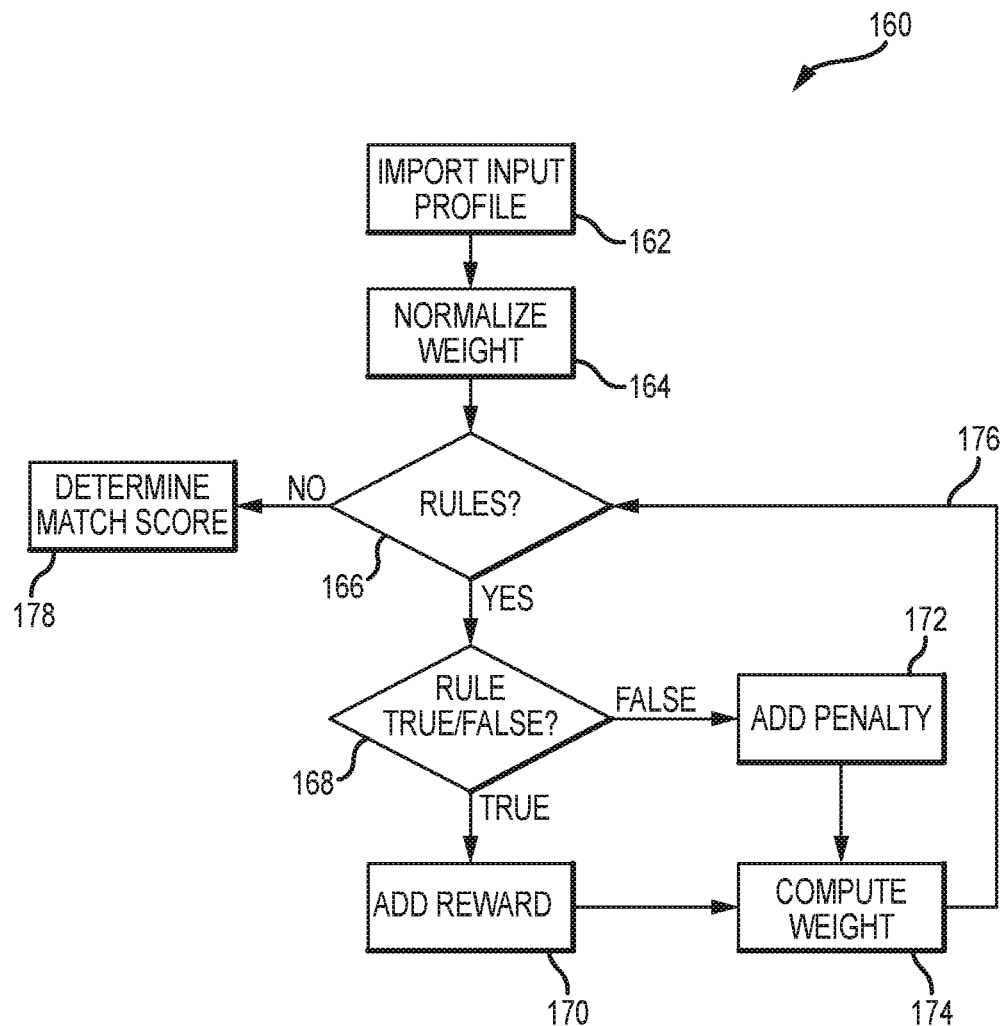
FIG. 12 is a flow chart of an embodiment of a method for calculating a match score.

FIG. 12 is a flow chart of an embodiment of an evaluation method 160 for determining a match score of a consumer product 120 with a collection of images based on the metadata extracted from the image files 60. The input profile 110 computed using 100 is imported into the image processing system 12 (block 162). For example, in certain embodiments, the input profile 110 corresponding to a single image file 60 may be evaluated. However, in other embodiments, the input profile may contain one or more image files 60 incorporated into the digital image collection 102.

A weight representative to the evaluation is normalized (e.g., set to zero) (block 164). In the illustrated embodiment, the weight is utilized to add and subtract the rewards and penalties associated with the rules (e.g., rules 142, 144, 146, 148, 150) incorporated with the product profile 140. The product profile 140 is evaluated to determine if there are pre-determined rules to evaluate (operator 166). For example, the product profile 140 may include a series of elements (forming rules) to evaluate against the image profile 90. In certain embodiments, the rule is a Boolean statement evaluating to TRUE/FALSE that provides a reward (e.g., positive value) when the condition is met (TRUE), and a penalty (e.g., negative value) when the condition is not met (FALSE), and in certain embodiments, no value. For example, in certain embodiments no value is assigned for FALSE designations because some elements may be strong indicators of correlation with the consumer products 120, yet, the absence of the elements may not be indicative that the consumer product 120 does not correlate to the input profile 110. For example, in the embodiment where the Christmas card 151 is illustrated, the presence of snow in the input profile 110 may be a strong indicator of a winter scene, but the absence is not necessarily indicative of a non-Christmas photographic image 62 since many photographs may be taken indoors.

After the weight is normalized, the input profile 110 is evaluated against the product profile 140 (block 168). For example, in the illustrated embodiment, the analysis includes evaluating the rule (e.g., rule 142, 144, 146, 148, 150) against each image profile 90. If the rule is met by the image (e.g., true), then the reward is added (block 170). If the rule is not met by the input (e.g., false), then the penalty is added (block 172). As described above, in certain embodiments the penalty may be set to zero. The weight is computed based on the output from the operator (block 174). That is, the value from the reward or penalty is added to the weight (e.g., normalized at block 164). Thereafter, the loop 176 returns to block 166 to evaluate whether the product profile 140 includes additional rules (e.g., rule 142, 144, 146, 148, 150). When the last rule of the product profile 140 is evaluated, the match score is determined (block 178). By way of example only, the following pseudo code may be utilized to perform the evaluation method 160:

match score initialized to 0.0
for each rule in product profile:
  for each image profile in the input profile:
    if the rule is met by the image profile
      match score=match score+reward
    else match_score=match_score+penalty
output match_score The match score is a representative value that correlates to how relevant the product profile 140 is to the input profile 110. In certain embodiments, the higher the match score, the more relevant the product profile. Furthermore, in certain embodiments, a threshold match score may be utilized to only present consumer products 120 which may be relevant to users 14. As a result, the number of consumer products 120 that the user 14 evaluates may be smaller, thereby simplifying the review and likelihood the user 14 will identify relevant consumer products 120.

In an embodiment, image files 60 from FIG. 2 may be evaluated utilizing the method 100 and the evaluation method 160. For example, as described above, features correlating to metadata of the image files 42 may be extracted. For example, the time and data metadata 70 may determine that the image file 60 was created (e.g., the picture was taken) in the first week of December. Furthermore, the location based metadata 72 may correlate to the family's home state, as opposed to on vacation at another location. Furthermore, content based metadata 74 may extract the Christmas tree 66 and the presents 68. Additionally, the face-based metadata 76 may exact four human faces from the photograph, indicative of a family picture. Accordingly, the image profile 90 may be created for later evaluation against the product profiles 140 of various consumer products 120. In certain embodiments, the image files 42 may be evaluated via the evaluation method 160 to select one or more consumer products 120. As described above, the input profile 110 may be uploaded to and the weight normalized, as illustrated in FIG. 12. Thereafter, the product profile 140 correlating to, for example, the Christmas card 122 may be evaluated against the input profile 110 to determine whether or not a match is present. For example, the product profile 140 for the Christmas card 122 may include rules corresponding to the metadata to apply a reward or penalty based on the evaluation of the image profile. In certain embodiments, the product profile 140 may have rules corresponding to colors (e.g., adding a reward for the presence of red or green), plants (e.g., the Christmas tree 66), and face-based metadata (e.g., family pictures). In the illustrated embodiment, the rule corresponding to the presence of the Christmas tree 66 would be evaluated as TRUE, thereby applying a reward (e.g., +5 points) when the weight is computed. Further evaluation may evaluate the rule corresponding to face-based metadata as TRUE, thereby also applying a reward (e.g., +1 point) when the weight is computed. In this manner, each rule of the product profile 140 may be evaluated and compared to the extracted metadata of the image file 60 to generate the match score. For example, a series of photographs with a Christmas theme may correlate to the photo book 126 having a winter and/or Christmas theme. In certain embodiments, high match scores correlate to consumer products 120 with high relevance to the image files 42, thereby presenting the consumer with more relevant products for purchase with less searching. For example, consumer products 120 with a match score above a threshold may be output to the display 16 (e.g., via a server) and displayed to the consumer for purchase.

Figure 13:
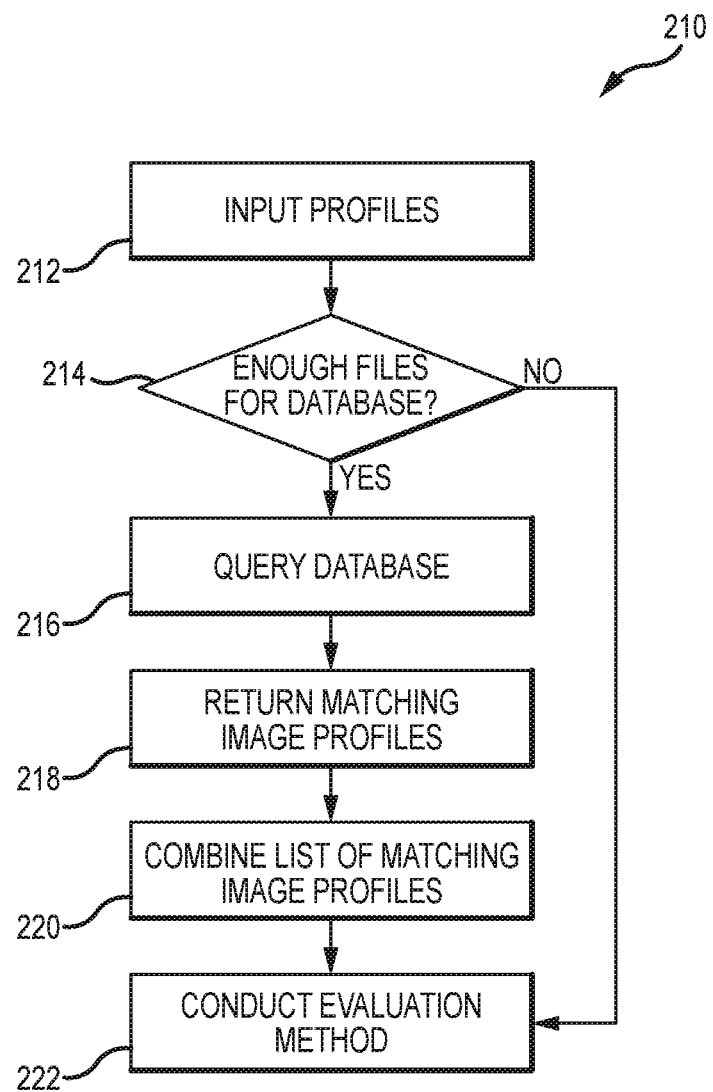
FIG. 13 is a flow chart of a method for evaluating an input profile database.

FIG. 13 is a flow chart of an embodiment of a database evaluation method 210 utilized to evaluate input profiles 110 containing large quantities of image profiles 90. For example, in certain embodiments, there may be over 1,000 image profiles 90. However, the database evaluation method 210 may also be utilized to evaluate input profiles 110 containing small quantities of image profiles 90. In the illustrated embodiment, the input profiles 90 are uploaded (block 212). For example, the image files 60 added to the image processing system 12 by the user 14 may be analyzed by the method 100 and the results saved in the input profile 110. The input profile 110 may be evaluated to determine whether there are sufficient image files 60 to be placed in a database (block 214). For example, in certain embodiments, there may be a threshold number of image files 60 to generate the database (e.g., 1,000 files). If there are enough image files 60 for the database, the database may receive a query (block 216). For example, the query may include a set of instructions or an interrogation, such as 'return a list of all image profiles 90 satisfying rule A.' The system may loop over the database and return matching image profiles 90 (block 218). Then, the system compiles the returned image profiles 90 to form a new input profile (block 220). Subsequently, the new input profile 110 may be evaluated (block 222) utilizing the evaluation method 160. Moreover, in embodiments where the input profile 110 is not large enough to have a database, the system may instruct the smaller input profile 110 to be evaluated (block 222) utilizing the evaluation method 160. In this manner, large databases of image profiles 90 may be queried and evaluated against the product profiles 140 before the match score is calculated, thereby limiting the evaluation to image profiles 90 likely to correlate to the product profiles 140.

Figure 14:
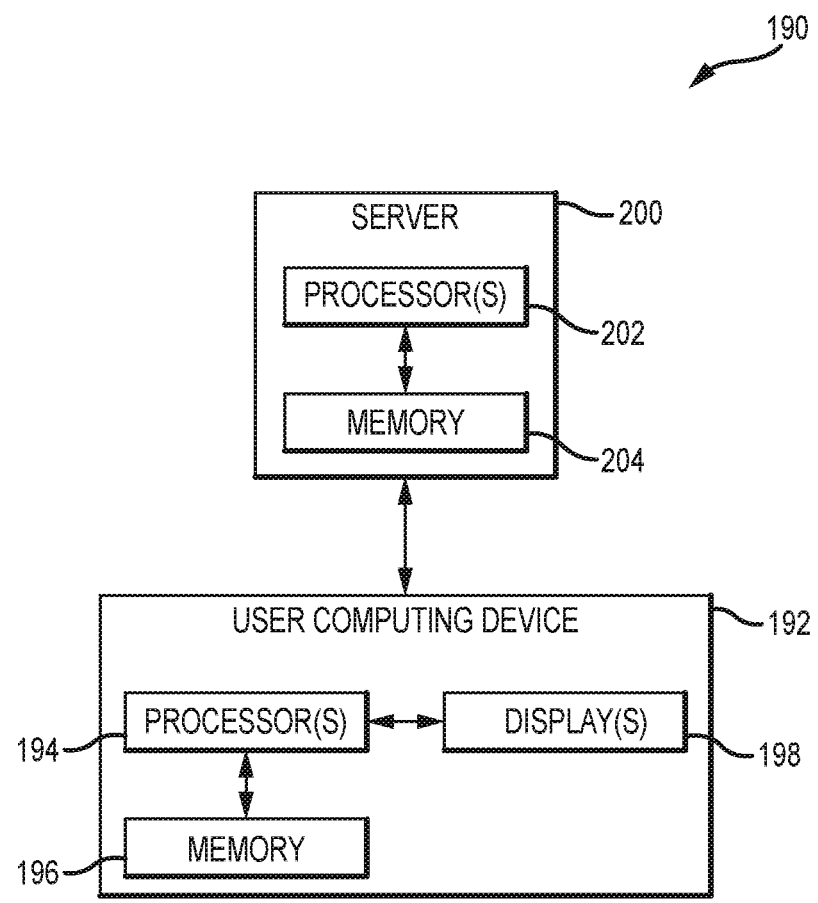
FIG. 14 is a schematic diagram of an embodiment of a computing system.

FIG. 14 is a block diagram of a computing system 190 which may be utilized by the image processing system 12. In the illustrated embodiment, the computing system 190 includes a user computing device 192, such as a desktop computer, a laptop, a tablet computer, a smartphone, a personal digital assistant, the image processing unit 10, the personal electronic device 24, and the like. The user computing device 192 can include one or more processors 194, such as a microprocessor, that may be used to execute machine-readable executable code for implementing the techniques described herein. Furthermore, in the illustrated embodiment, the user computing device 192 includes one or more memories 196 (e.g., non-transitory computer-readable media) which may include non-volatile memory, such as read-only memory (ROM), EEPROM, and/or flash memory which may be used in conjunction with volatile memory, such as Dynamic Random Access Memory (DRAM) and/or Static Random Access Memory (SRAM). Further, the user computing device 192 may include one or more displays 198, such as the display 16, in communication with the one or more processors 194.

In certain embodiments, the product profiles 140 are loaded onto a server 200 having one or more processors 202 and one or more memories 204, as described above with respect to the user computing device 192. Furthermore, the server 200 can be in communication with the user computing device 192 (e.g., via a wired or wireless internet connection, Wi-Fi, BLUETOOTH, cellular, etc.) to send and receive information indicative of the consumer products 120 related to the product profiles 140. In certain embodiments, the one or more processors 202 of the server 200 perform the evaluation method 160 utilizing readable code stored on the one or more memories. For example, the user computing device 192 may upload the image profiles 90 to the server 200 for further evaluation. Upon completion of the evaluation method 160, the server 200 may relate a list of consumer products 120 to the user computing device 192. However, in certain embodiments the evaluation method 160 may be performed by the user computing device 192.

As described in detail above, embodiments of the present disclosure include the method 160 for evaluating and presenting a list of consumer products 120 related to the input profile 110 based on properties of the image files 60 and the consumer products 120. For example, the method 160 may compare metadata of the image files 60 stored in the input profiles 110 to product profiles 140 of the consumer products 120. The method 160 may assign a positive value to corresponding features and a negative value to unrelated features. As a result, the consumer products 120 may be evaluated to determine whether they are relevant for the given set of input profiles 110. That is, the method 160 may compute the match score to determine how well the consumer product 120 correlates to the image files 60. As a result, the image processing system 12 may only display the relevant matches to the user 14, thereby simplifying the review and purchase process for the user 14.

The foregoing disclosure and description of the invention is illustrative and explanatory of the embodiments of the invention. Various changes in the details of the illustrated embodiments can be made within the scope of the appended claims without departing from the true spirit of the invention. The embodiments of the present invention should only be limited by the following claims and their legal equivalents.

The invention claimed is:

1. A method for creating a consumer photo product recommendation, comprising:
receiving, at an image processing unit, a digital image collection comprising a plurality of image files;

extracting recorded metadata from the image files, wherein the recorded metadata comprises location information and capture time information;

extracting content-based metadata indicative of one or more characterizing content profiles from the image files independent of other types of metadata, wherein the content-based metadata is derived from an analysis of image pixels of a background or scenery of each of the image files;

extracting face-based metadata from the image files, wherein the face-based metadata is derived from an analysis of image pixels in each of the image files;

extracting event-based metadata including a temporal duration of an event, number of images in the event, and event user tags from the image files, wherein the event-based metadata is derived from an analysis of image pixels in each of the image files;

creating an input profile for the digital image collection defined by the extracted recorded metadata, extracted content-based metadata, extracted face-based metadata, and extracted event-based metadata;

comparing the input profile to a plurality of product profiles, wherein each product profile corresponds to a different consumer photo product and comprises one or more product profile rules corresponding to each respective consumer photo product, wherein the product profile rules define features of each respective consumer photo product, and wherein each product profile rule is configured to provide a reward if it is satisfied, or a penalty or no value if it is not satisfied;

determining a match score for each product profile compared to the input profile, wherein the match score is indicative of a relevancy of the product profile to the input profile and a higher match score correlates to a higher relevancy, and wherein the match score is determined in part by evaluating whether the input profile satisfies the product profile rules; and displaying, on an interface of the image processing unit, a rendering of the consumer photo products corresponding to the product profiles having a match score above a pre-established threshold.

2. The method of claim 1, wherein determining the match score for each product profile compared to the input profile comprises increasing the match score when a product profile rule is met by the input profile.

3. The method of claim 1, wherein determining the match score for each product profile compared to the input profile comprises decreasing the match score when a product profile rule is not met by the input profile.

4. The method of claim 1, further comprising receiving the product profiles from a pre-loaded catalog on a server.

5. The method of claim 1, further comprising displaying, on the interface of the image processing unit, the consumer product associated with the product profile having the highest match score.

6. The method of claim 1, wherein displaying a rendering of the consumer photo products comprises listing the consumer products from highest match score to lowest match score.

7. The method of claim 1, wherein determining the match score for each product profile compared to the input profile comprises neither increasing nor decreasing the match score when a product profile rule is not met by the input profile.

* * * * *